(12) United States Patent
Shigematsu

(10) Patent No.: US 6,504,647 B1
(45) Date of Patent: Jan. 7, 2003

(54) OPTICAL FIBER AMPLIFIER, A METHOD OF AMPLIFYING OPTICAL SIGNALS, OPTICAL COMMUNICATIONS SYSTEM

(75) Inventor: Masayuki Shigematsu, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/633,785

(22) Filed: Aug. 7, 2000

(30) Foreign Application Priority Data

Aug. 10, 1999 (JP) .......................... 11-226641

(51) Int. Cl.⁷ .............................. H04B 10/17
(52) U.S. Cl. .................................. 359/341.3
(58) Field of Search .................. 385/47, 48, 39, 385/40, 18, 27, 33, 37; 359/124, 127, 139, 143, 353, 613, 634, 341.3, 341.2, 349, 337, 341.31, 341.32; 372/6

(56) References Cited

U.S. PATENT DOCUMENTS

| | | | | |
|---|---|---|---|---|
| 5,822,113 A | * | 10/1998 | Delavaux | 359/341 |
| 6,104,527 A | * | 8/2000 | Yang | 331/116 FE |
| 6,097,533 A | * | 10/2000 | Atlas | 359/337 |
| 6,252,700 B1 | * | 6/2001 | Hwang et al. | 359/337 |
| 6,288,834 B1 | * | 9/2001 | Sugaya et al. | 359/341.1 |
| 6,317,254 B1 | * | 11/2001 | Park et al. | 359/341.33 |

FOREIGN PATENT DOCUMENTS

JP 2000-164956 * 6/2000

OTHER PUBLICATIONS

"Comparison of amplification characteristics of 1.58 and 1.55μm band EDFAs", H. Ono et al., Electronics Letters, vol. 34, No. 15, Jul. 23,1998, pp.1509–1510.
"A Novel Configuration of L–Band Erbium–doped Fiber Amplifier for Improved Efficiency", M. Shigematsu et al., 25th European Conference on Optical Communication, vol. 1, Sep. 1999.
"Enhancement of Power Conversion Efficiency for an L–Band EDFA with a Secondary Pumping Effect in the Unpumped EDF Section", J. Lee et al., IEEE Photonics Technology Letters, vol. 11, No.1, Jan. 1999, pp.42–44.

(List continued on next page.)

Primary Examiner—Thomas H. Tarcza
Assistant Examiner—Andrew R. Sommer
(74) Attorney, Agent, or Firm—McDermott, Will & Emery

(57) ABSTRACT

An optical fiber amplifier has an optical amplification portion, pumping light source, and optical circulator portion. The optical amplification portion has a signal input port, signal output port, and two erbium-doped optical fibers. These optical fibers are connected in series between the signal input port and the signal output port. The pumping light source is optically coupled to the optical fibers through an optical coupler to supply pumping light to the optical fibers. The optical circulator portion supplies backward ASE light obtained from the signal input port of the optical amplification portion to the signal output port thereof. With this arrangement, not only forward ASE light but also backward ASE light can be supplied to the optical amplification portion. There is no additional optical fiber, which is not pumped by light for the light source, to use both ASE light components for optical amplification.

19 Claims, 8 Drawing Sheets

OTHER PUBLICATIONS

"1.58μm–Band Er³⁺–Doped Fiber Amplification with a 1.55–μm–Band Light Injection", Y. Sugaya et al., Third Optoelectronics and Communications Conference (OECC '98) Technical Digest, Jul. 1998, pp. 498–499.

Mahdi, M.A. et al. "Siumltaneous bi–directional of C–and L–Band erbium doped amplifier," OFCC 2000, Mar. 2000, pages 8–1.*

Buxens, A. et al. "Gain Flattened L–Band EDFA based on upgraded C–Band EDFA using forward ASE pumping in an EDF Section." Elect. Lett 36:9, Apr. 2000, p. 821–823.*

Flood, F.A. "L–Band erbium–doped fiber amplifiers." OFCC 2000, Mar. 2000, p. 102–104.*

Hansen, K.P. and Nielsen, M.D. "L–Band Erbium–Doped Fiber Amplifiers —Theory and Design." Thesis published Jan. 31, 2000.*

Lee, JH et al. "Improvement of 1.57–1.61 um Band Amplification Efficiency by Recycling Wasted Backward ASE through Unpumped EDF Section." Optical Fiber Communications Conference, vol. 2, pp 7–9, Feb. 26, 1999.*

* cited by examiner

OPTICAL FIBER AMPLIFIER, A METHOD OF AMPLIFYING OPTICAL SIGNALS, OPTICAL COMMUNICATIONS SYSTEM

BACKGROUND OF THE INVENTION

1. Field of the Invention

The present invention relates to an optical fiber amplifier, a method of amplifying optical signals, and an optical communication system.

2. Related Background Art

Recently, erbium-doped optical fiber amplifiers for the 1,580-nm band (referred to as L-band EDFAs hereinafter) have been studied. This study is made to achieve WDM transmission in the 1,580-nm band (L band). For dispersion-shifted fibers, this WDM transmission is used to avoid nonlinear effects such as four-wave mixing. According to the WDM transmission, the capacity of WDM transmission can be increased using optical fiber amplifiers for the existing 1,550-nm (C-band) in parallel.

SUMMARY OF THE INVENTION

The present inventor has examined various studies while studying the L-band EDFAs, and found the following matter.

Reference 1 (Electron Lett. Vol. 34, No. 15, pp. 1,509–1,510, 1998) discloses as follows: L-band EDFAs require higher pumping power because it has a lower power conversion efficiency than that of C-band EDFAS.

To compensate for this power conversion efficiency, the following researches have been made. One research, as described in reference 2 (Optoelectronics and Communications Conference 98, 16C2-4, 1998), shows: (a) additional pumping light is supplied from an additional 1,550-nm band optical pumping light source to an erbium-doped optical fiber (EDF). This EDFA needs an additional 1,550-nm band optical pumping light source, so that the number of parts for the EDFA increases and extra power is required for the optical pumping light source. Another research, as described in reference 3 (Photon Technol. Lett. Vol. 11, No. 1, pp. 42–44, 1999), shows: (b) amplified spontaneous emission (to be referred to as ASE hereinafter) generated in 1,550-nm band is used for optical amplification in an erbium-doped optical fiber (EDF) which is not pumped by pumping light from a light source.

The latter includes two types of configurations. In one of the configurations, (b1) first and second EDFs are connected in series, and 1,480-nm pumping light is supplied to the junction of the EDFs so as to pump the only first EDF. Then, only forward ASE light, generated in the first EDF, is supplied to the second EDF in this configuration. In the other configuration, (b2) first and second EDFs are connected in series, and 1,480-nm pumping light is supplied to the junction of the EDFs so as to pump the only second EDF. Then, only backward ASE light, generated in the second EDF, is supplied to the first EDF in this configuration.

These EDFAs can improve the power conversion efficiency. Each EDFA, however, needs an additional EDF which is not pumped by pumping light. In addition, these EDFAs can use only one of the forward ASE light and backward ASE light.

It is an object of the present invention to provide an optical fiber amplifier, a method of amplifying an optical signal, and an optical communication system, which can use both forward ASE light and backward ASE light.

An optical fiber amplifier according to the present invention comprises an optical amplification portion and optical circulator portion. The optical fiber amplifier has an input terminal and output terminal. The optical amplification portion has an input port provided so as to receive pumping light, an output port, and an optical fiber device provided between the input and output ports. Erbium is doped to the optical fiber device. The optical circulator portion has a first port coupled to the input terminal, a second port coupled to the input of the optical amplification portion, a third port coupled to the output from the optical amplification portion, and a fourth port coupled to the output terminal. In the optical circulator portion, light from the first port is supplied to the second port, light from the second port is supplied to the third port, and light from the third port is supplied to the fourth port.

When pumping light and signal light enter the optical fiber device through the input of the optical amplification portion, forward ASE light and backward ASE light are generated. The forward ASE light is used for optical amplification in the optical fiber device. The backward ASE light is provided to the output of the optical amplification portion through the second and third ports of the optical circulator portion. Hence, the backward ASE light is also used for optical amplification in the optical fiber.

The optical fiber amplifier according to the present invention comprises an optical amplification portion and optical circuit device. The optical circuit device is provided between the optical amplification portion and the input and output terminals. The 1,580-nm band light can pass through the optical circuit device from the input terminal to the input port of the optical amplification portion. The 1,580-nm band light can pass through the optical circuit device from the output port of the optical amplification portion to the output terminal. The 1,550-nm band light can pass through the optical circuit device from the input port to the output port of the optical amplification portion, vice versa. The 1,580-nm band light cannot, however, pass through the optical circuit device between the input port and the output port of the optical amplification portion.

In this optical fiber amplifier, the 1,550-nm band backward ASE light from the input of the optical amplification portion is supplied through the optical circuit device to the output of the optical amplification portion. Hence, the optical amplification portion utilizes both the forward ASE light and backward ASE light.

According to another aspect of the present invention, there is provided a method of optically amplifying signal light using an optical fiber device doped with at least erbium. The method comprises the steps of: (1) providing the signal light and light to a first terminal portion of the optical fiber device; (2) obtaining ASE light from the first terminal portion of the optical fiber device; (3) providing the ASE light to a second terminal portion of the optical fiber device, and (4) obtaining amplified signal light from the second terminal portion of the optical fiber device.

When pumping light is supplied to the optical fiber device, forward ASE light and backward ASE light is generated therein. The backward ASE light is obtained from the first terminal of the optical fiber device and supplied to the second terminal of the optical fiber device. Thus, both the forward ASE light and backward ASE light are utilized for optical amplification in the optical fiber device.

An optical communication system according to the present invention comprises one or more optical fiber amplifiers, and a plurality of optical transmission lines connected to the input and output terminals of the optical fiber amplifiers. The optical fiber amplifiers have configuration as described below or already described above.

BRIEF DESCRIPTION OF THE DRAWINGS

Other objects, features, and advantages of the present invention will be apparent from the following detailed description of preferred embodiments of the present invention in conjunction with the accompanying drawings.

DESCRIPTION OF THE PREFERRED EMBODIMENTS

Figure 1:
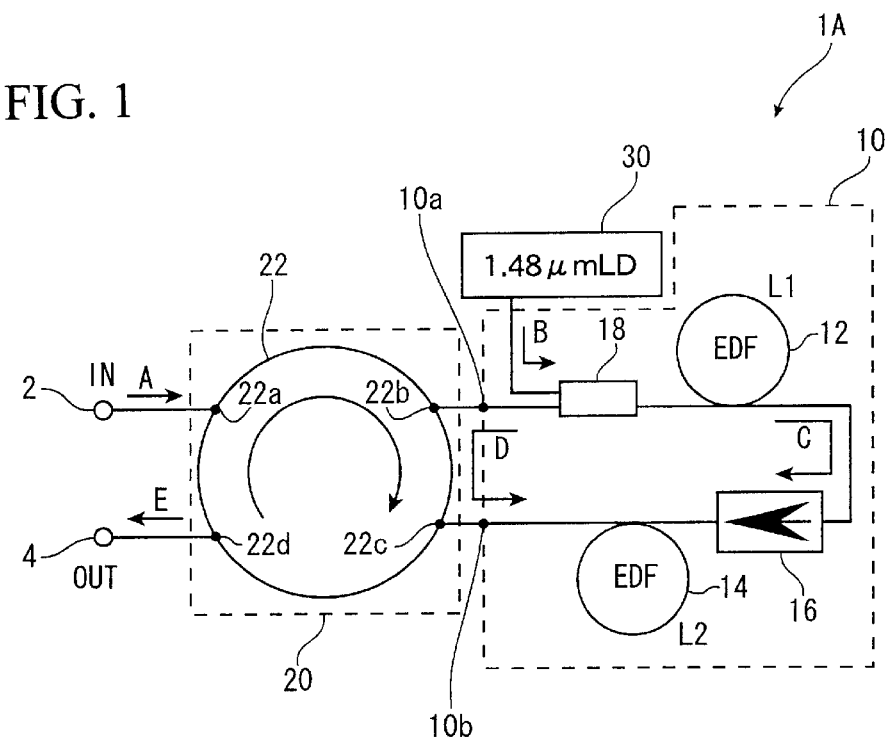
FIG. 1 is a block diagram of an optical fiber amplifier according to an embodiment.

The embodiments of the present invention will be described below with reference to the accompanying drawings. If possible, the same reference numerals denote the same and similar parts throughout the drawings, and a detailed description thereof will be omitted.

In the following embodiments, a 1,550-nm band means a wavelength range of about 1,520 nm to about 1,565 nm, and a 1,580-nm band means a wavelength range of about 1,565 nm to about 1,610 nm.

An optical fiber amplifier according to the first embodiment of the present invention will be described below with reference to FIG. 1. An optical fiber amplifier 1A amplifies signal light received at an input terminal 2 and supplies the amplified signal light to an output terminal 4. This optical fiber amplifier 1A comprises an optical amplification portion 10, optical circulator portion 20, and pumping light source 30.

The optical amplification portion 10 has an optical fiber device including a signal input port 10a provided so as to receive signal light, a signal output port 10b provided so as to output amplified signal light, and a first optical fiber 12 and second optical fiber 14. The first optical fiber 12 and second optical fiber 14 contain at least erbium dopant as an active element that contributes to optical amplification. The first and second optical fibers 12 and 14, connected in series, are disposed between the signal input port 10a and the signal output port 10b.

The optical circulator portion 20 includes a 4-port optical circulator 22 as shown in FIG. 1. The optical circulator 22 has first to fourth ports 22a to 22d. The first port 22a is coupled to the input terminal 2. The second port 22b is coupled to the signal input port 10a of the optical amplification portion 10. The third port 22c is coupled to the signal output port 10b of the optical amplification portion 10. The fourth port 22d is coupled to the output terminal 4.

The optical circulator 22 provides light from the first port 22a to the second port 22b, from the second port 22b to the third port 22c, and from the third port 22c to the fourth port 22d.

The pumping light source 30 can be a light emitting element, such as a semiconductor laser for generating 1,480 nm pumping light. The pumping light source 30 is optically coupled to the optical fibers 12 and 14 through an optical multiplexer, such as an optical coupler 18, whereby pumping light is supplied to the first and second optical fibers 12 and 14.

In the optical amplification portion 10, an optical isolator 16 is disposed between the first optical fiber 12 and the second optical fiber 14. The optical isolator 16 transmits light propagating in only one direction from the first optical fiber 12 to the second optical fiber 14, and blocks light propagating in the reverse direction.

Subsequently, the operation of the optical amplifier 1A will be described. The optical amplification portion 10 amplifies signal light A to generate amplified signal light E. The amplified signal light E is output to the output terminal (OUT) 4.

In this optical amplifier, the 1,580-nm band signal light A to be amplified is obtained from the input terminal (IN) 2. The pumping light source 30 supplies 1,480-nm band pumping light B. The light A and B are entered to the first optical fiber 12 after they are multiplexed by the optical coupler 18, and are supplied to the second optical fiber 14 through the optical isolator 16.

The first optical fiber 12 generates forward ASE light C and backward ASE light D, which have wavelength components in the 1,550-nm band. The forward ASE light C propagates in the same direction as that of the signal light A. The backward ASE light D propagates in a direction reverse to the signal light A.

The forward ASE light C serves as pumping light for optical amplification in the first optical fiber 12. The forward ASE light C is also supplied to the second optical fiber 14 through the optical isolator 16 and is used as pumping light for optical amplification.

The backward ASE light D is supplied to the second optical fiber 14 through the second and third ports 22b, 22c of the optical circulator 22 and the signal output port 10b of the optical amplification portion 10. Thus, the backward ASE light D is also used for optical amplification. The backward ASE light D passes through the second optical fiber 14 and is then blocked by the optical isolator 16, so that the backward ASE light D does not reach the first optical fiber 12. This prevents oscillation that may be caused by ASE light propagating in a direction reverse to the signal light.

As described above, in order to amplify signal light, the optical fiber amplifier 1A in accordance with this embodiment can utilize both the forward ASE light and backward ASE light. This utilization improves the power conversion efficiency of the optical fiber amplifier. The first optical fiber 12 and second optical fiber 14 use the pumping light B supplied from the pumping light source 30 for optical amplification. Further, in the optical fiber amplifier 1A, an optical fiber having a length required for the optical fiber amplifier 1A is divided at an appropriate ratio to form first and second optical fibers 12 and 14. In the optical fiber amplifier of the embodiment as described above, no additional optical fiber, which is not pumped by pumping light from the pumping light source, is required to utilize both the forward ASE light and backward ASE light as pumping light.

An optical fiber amplifier according to the second embodiment will be described with reference to FIG. 2. Although the optical circulator portion 20 includes the 4-port optical circulator 22 in the first embodiment, an optical fiber amplifier 1B, which includes optical circulator portion 20 having two 3-port optical circulators, will be described in the second embodiment. An optical amplification portion 10 and pumping light source 30 have the same configurations as in the first embodiment, but are not limited thereto.

In the optical fiber amplifier 1B, the optical circulator portion 20 includes first and second 3-port optical circulators 24 and 26.

The first 3-port optical circulator 24 has a first port 24a, second port 24b, and third port 24c. In the optical circulator 24, light from the first port 24a can pass to the second port 24b, and light from the second port 24b can pass to the third port 24c.

The second 3-port optical circulator 26 has a first port 26a, second port 26b, and third port 26c. In the optical circulator 26, light from the second port 26b can pass to the first port 26a, and light from the third port 26c can pass to the second port 26b.

In the optical circulator 24, the first port 24a is coupled to the input terminal 2. The second port 24b is coupled to the signal input port 10a of the optical amplification portion 10. In the optical circulator 26, the first port 26a is coupled to the output terminal 4. The second port 26b of the optical circulator 26 is coupled to a signal output port 10b of the optical amplification portion 10. The third port 26c is coupled to the third port 24c of the optical circulator 24.

In addition, in this embodiment, the two optical circulators 24 and 26 are connected between the signal input port 10a and the signal output port 10b of the optical amplification portion 10. This connection ensures the optical separation between the ports 24b and 26b in the optical circulator portion 20 while allowing backward ASE light to pass from the signal input port 10a to the signal output port 10b of the optical amplification portion 10. This separation also prevents oscillation that may be caused by leakage of light from the signal output port 10b to the signal input port 10a, and suppresses the increase of bit error rate.

An optical fiber amplifier according to the third embodiment of the present invention will be described with reference to FIG. 3. An optical fiber amplifier 1C has an optical amplification portion 10, optical circuit device 40, and pumping light source 30. The optical amplification portion 10 and pumping light source 30 have the same configurations as in the first embodiment, but are not limited thereto.

The optical circuit device 40 has first to fourth ports 40a to 40d. The first port 40a is connected to an input terminal 2. The second port 40b is connected to the signal input port 10a of the optical amplification portion 10. The third port 40c is connected to a signal output port 10b of the optical amplification portion 10. The fourth port 40d is connected to an output terminal 4. In the optical circuit device 40, 1,580-nm band light can pass between the first port 40a and the second port 40b and between the third port 40c and the fourth port 40d. The 1,580-nm band light is blocked between the second port 40b and the third port 40c, but 1,550-nm band light can pass therethrough.

In the optical circuit device 40, only 1,550-nm band light can pass between the second port 40b and the third port 40c, so that backward ASE light D in the 1,550-nm band is obtained from the signal input port 10a of the optical amplification portion 10 and supplied to the signal output port 10b. On the other hand, forward ASE light C is supplied to the second optical fiber 14 through an optical isolator 16 in the optical amplification portion 10. Since both the forward ASE light C and backward ASE light D are used for optical amplification, the power conversion efficiency of the erbium-doped optical fiber amplifier can be improved.

Figure 4A:
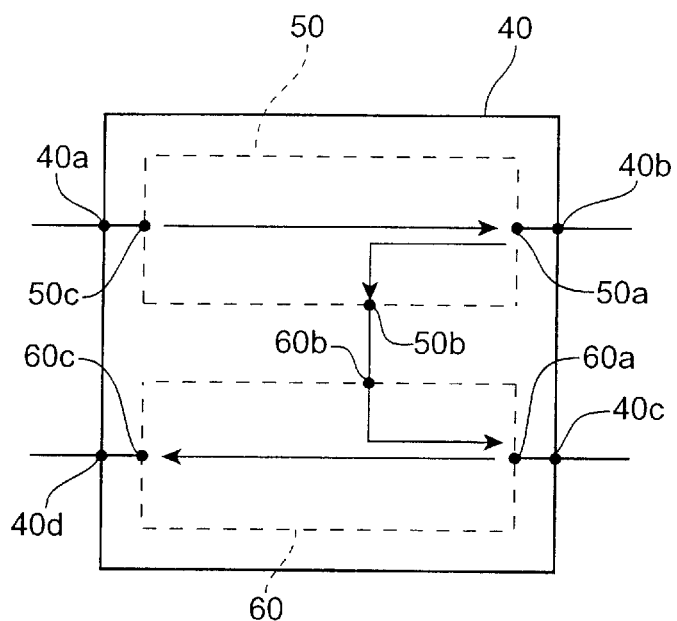
FIG. 4A is a block diagram of an optical circuit device.
Figure 4B:
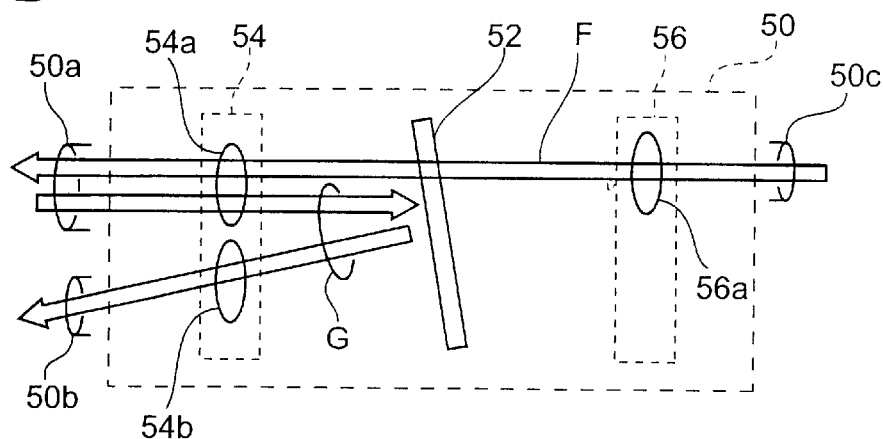
FIGS. 4B and 4C are views showing the structures of optical circuit device portions.
Figure 4C:
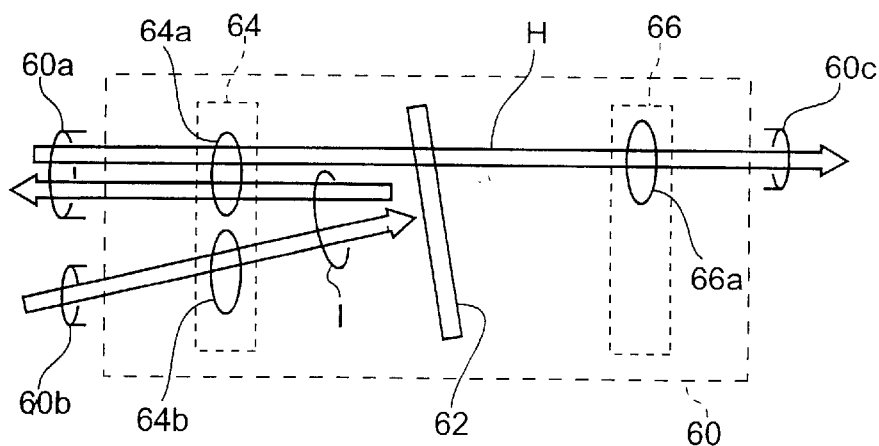

FIGS. 4A to 4C show the detailed configurations of the optical circuit device 40. Referring to FIG. 4A, the optical circuit device 40 has first and second optical circuit device portions 50 and 60.

Referring to FIG. 4B, the first optical circuit device portion 50 has a first port 50a optically coupled to the signal input port 10a of the optical amplification portion 10, a second port 50b, and a third port 50c optically coupled to the input terminal 2. The first optical circuit device portion 50 has an optical filtering means disposed between the third port 50c and the first and second ports 50a and 50b. The optical filtering means includes an optical filter and can selectively reflect or transmit light in the ASE wavelength band, which is used for optical amplification, and light in the signal wavelength band. The optical filtering means can transmit light in the ASE wavelength band and reflect light in the signal wavelength band. An example of the optical filter is a dielectric multilayer filter 52. This optical filter can reflect one of 1,550-nm band light and 1,580-nm band light, and transmit the other.

The dielectric multilayered film filter 52 in this embodiment can reflect 1,550-nm band light and transmit 1,580-nm band light.

Means for condensing light 54 is disposed between the dielectric multilayer filter 52 and the first and second ports 50a and 50b. The light condensing means 54 includes lenses 54a and 54b for condensing light, which is transmitted through the dielectric multilayer filter 52 and reflected by the dielectric multilayer filter 52, to respective ports. Another means for condensing light 56 is disposed between the dielectric multilayer filter 52 and the third port 50c. This condenser means 56 includes a lens 56a for condensing transmitted light.

In the first optical circuit device portion 50 as shown in FIG. 4B, 1,580-nm band light F is entered to the third port 50c and reaches the first port 50a through the dielectric multilayer filter 52. When the 1,580-nm band light is entered to the first port 50a, this light propagates on an optical path, where the above light F propagates, in the reverse direction and reaches the third port 50c. In addition, 1,550-nm band light G is entered to the first port 50a and then reflected by the dielectric multilayer filter 52 to the second port 50b. When the 1,550-nm band light is entered to the second port 50b, this light propagates on an optical path, where the above light G propagates, in the reverse direction and reaches the first port 50a.

When the dielectric multilayer filter can reflect 1,580-nm band light and transmit the 1,550-nm band light, a person skilled in the art can understand the operation of the first optical circuit device portion 50 by replacing the term "1,550-nm band" and "1,580-nm band" in the above description with each other.

The second optical circuit device portion 60 has first to third ports 60a to 60c. The first port 60a is optically coupled to the signal output end 10b of the optical amplification portion 10. The second port 60b is optically coupled to the second port 50b of the first optical circuit device portion 50. The third port 60c is optically coupled to the output terminal 4.

Referring to FIG. 4C, the second optical circuit device portion 60 has the same structure as that of the first optical circuit device portion 50, but is not limited thereto. In the second optical circuit device portion 60 shown in FIG. 4C, 1,580-nm band light H is entered to the first port 60a and reaches the third port 60c through a dielectric multilayer filter 62. When the 1,580-nm band light is entered to the third port 60c, the light propagates on an optical path, where the above light H propagates, in the reverse direction and reaches the first port 60a. In addition, 1,550-nm band light I is entered to the first port 60a and is reflected toward the second port 60b by the dielectric multilayer filter 62. When the 1,550-nm band light is entered to the second port 60b, the light propagates on an optical path, where the above light I propagates, in the reverse direction and reaches the first port 60a.

A procedure of amplifying input signal light in this optical fiber amplifier 1C will be described. Signal light A is supplied to one end of the optical fiber 12 with pumping light B supplied to the optical fiber devices (optical fibers 12 and 14). When the pumping light B and signal light A are supplied thereto, the optical fiber 12 generates forward ASE light C and backward ASE light D. The backward ASE light D is obtained from one end of the optical fiber 12. This backward ASE light D is supplied to the other end of the optical fiber device. As a result, not only the pumping light but also the forward and backward ASE light are used to amplify the input signal light. This improves the power use efficiency of the optical fiber amplifier.

The optical isolator 16 is disposed between the optical fiber 12 and the optical fiber 14. The optical isolator 16 blocks backward ASE light supplied to the other end of the second optical fiber 14, thereby preventing the backward ASE light from entering the first optical fiber 12.

Figure 2:
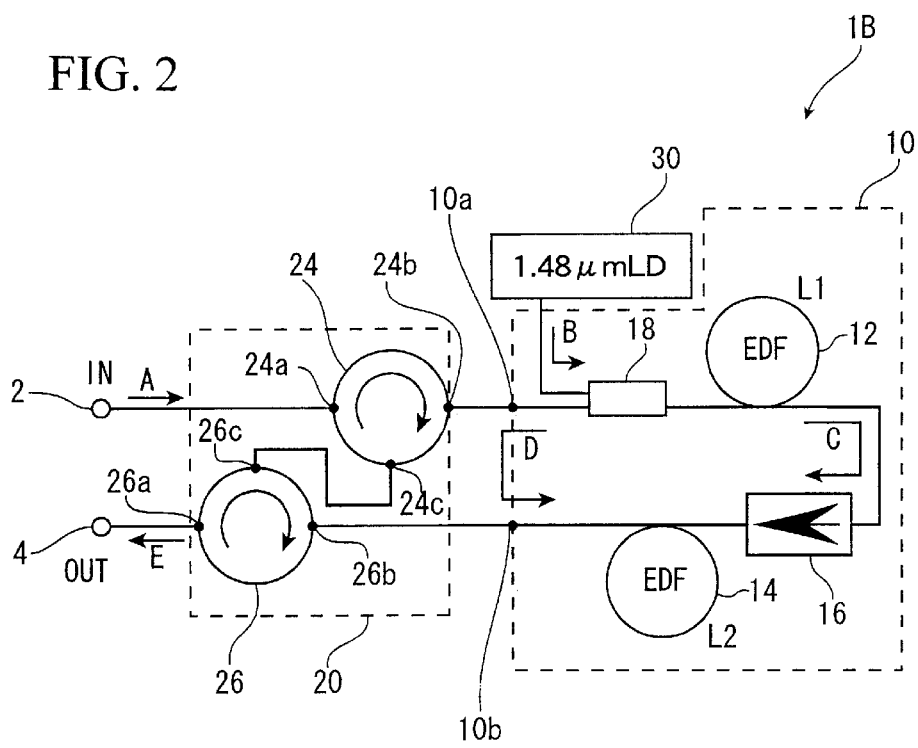
FIG. 2 is a block diagram of an optical fiber amplifier according to another embodiment.
Figure 3:
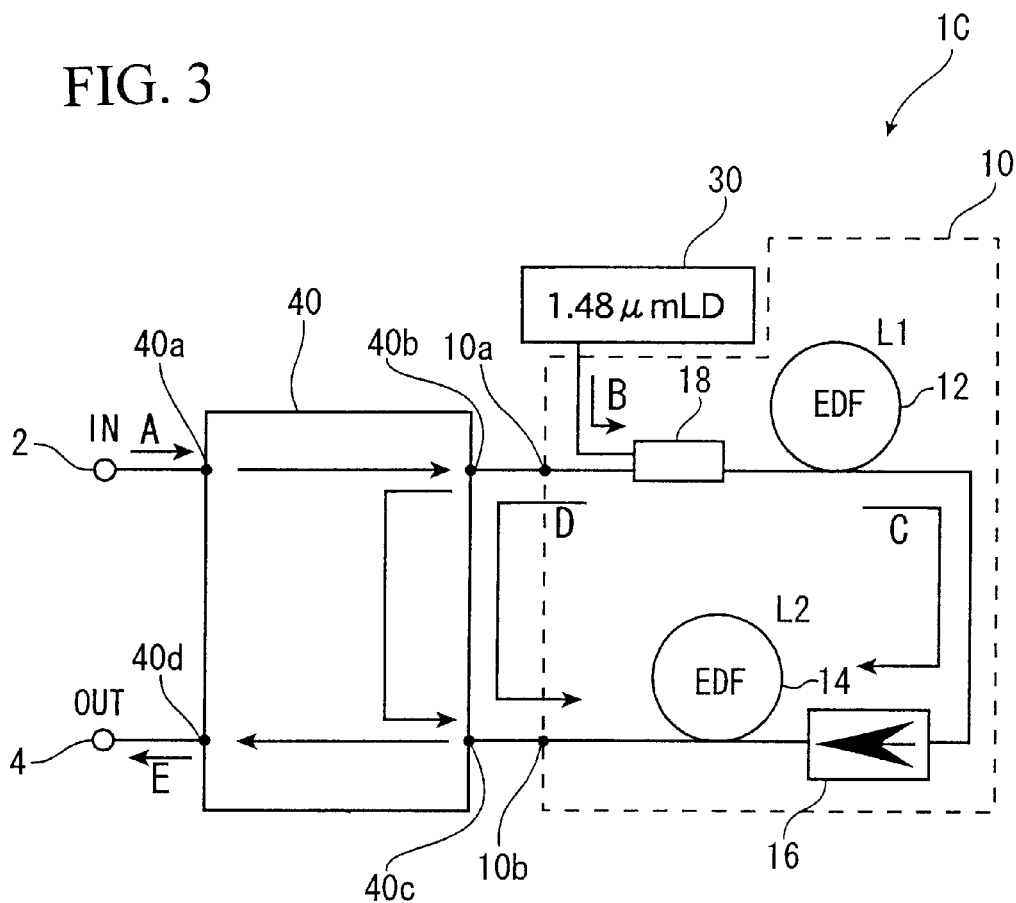
FIG. 3 is a block diagram of an optical fiber amplifier according to still another embodiment.

As is apparent from the above description, the same operations and advantages as in the first embodiment can be obtained when the optical fiber amplifier 1B shown in FIG. 2 and optical fiber amplifier 1C shown in FIG. 3 are used.

The results of experiments, conducted using the optical fiber amplifier 1A of the first embodiment, will be described.

The amplifying optical fiber used in the experiments is a high-gain EDF having shifted cutoff wavelength. In this optical fiber, erbium (Er) and aluminum (Al) are co-doped in the whole silica core region doped with germanium (Ge). The cladding region is doped with fluorine (F). This optical fiber has a relative refractive index deference of $\Delta=1.3\%$ and cutoff wavelength of $\lambda c=1.3$ $\mu$m. The concentration of erbium is 1,000 ppm. This EDF exhibited a signal gain of 18 dB at a length of 35 m under a gain flattened condition.

Figure 5:
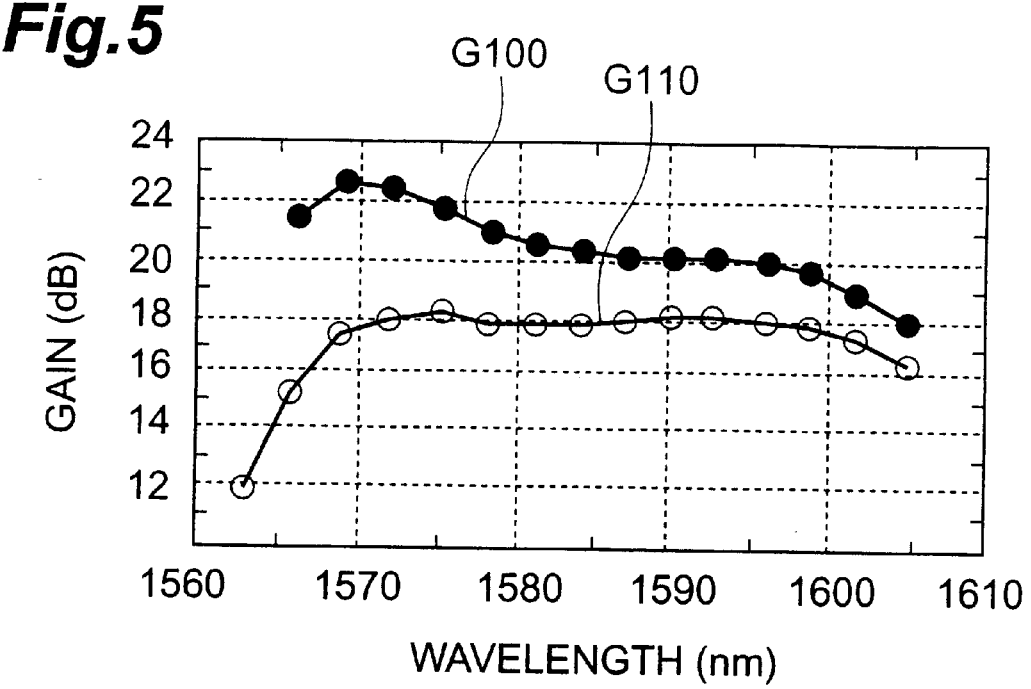
FIG. 5 is a graph showing the gain characteristics of optical fiber amplifiers.
Figure 6:
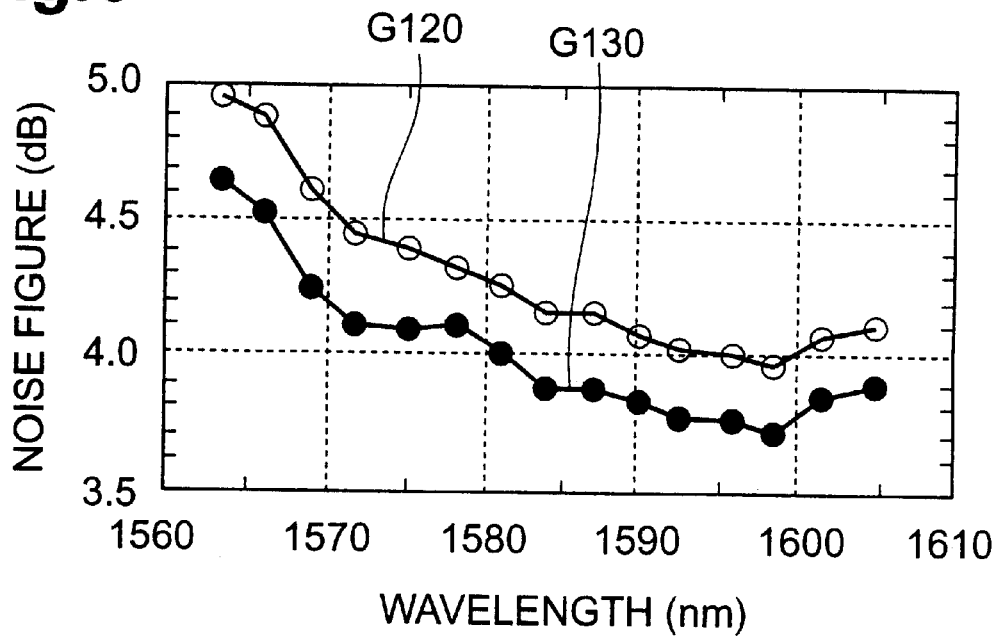
FIG. 6 is a graph showing the noise figure characteristics of optical fiber amplifiers.
Figure 7:
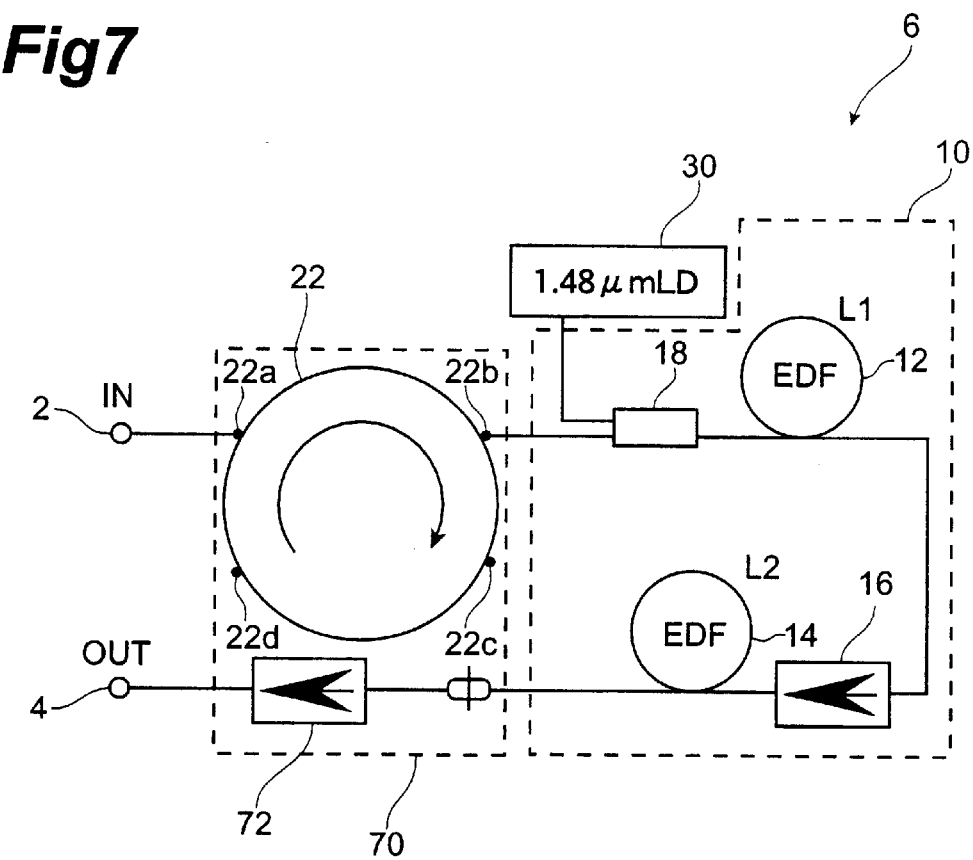
FIG. 7 is a block diagram of an optical fiber amplifier for comparison with the embodiment.

FIGS. 5 and 6 are graphs showing the wavelength dependences of gain and noise figure, which were measured for the above optical fiber. In the measurement, the input signal power is −10 dBm, and the length of the first optical fiber 12 is 10 meters. Referring to FIGS. 5 and 6, curves G100 and G120 also represent measurement results for the optical fiber amplifier 1A shown in FIG. 1, respectively. Curves G110 and G130 represent measurement results for a optical fiber amplifier 6 for reference shown in FIG. 7 for comparison. In the optical fiber amplifier 6 shown in FIG. 7, third and fourth ports 22c and 22d of an optical circulator 22 are not connected. The optical circulator 22 works as an optical isolator. In the optical fiber amplifier 6, an optical isolator 72 is added to the output terminal (OUT). For both optical fiber amplifiers, measurement was done for the same amplifying optical fiber length, the same input signal power, and the same pump power.

When the pump power is 68 mW in the optical fiber amplifier 6 for reference, the gain is 18 dB, and the noise figure is lower than 4.5 dB in the wavelength range of 1,570 nm to 1,600 nm.

On the other hand, for the optical fiber amplifier 1A, backward ASE light having a power of 10 mW can be supplied to the signal output terminal of the optical amplification portion 10. When this ASE light is added, the gain increases and the noise figure are improved in the wavelength range of 1,570 nm to 1,600 nm. The gain increment exceeds 1.8 dB, and the noise figure is improved by 0.3 dB. Under a gain flattened condition, the pump power can be reduced to 50 mW without degrading the noise figure. In addition, when the input power was 0 dBm, the pump power is reduced from 177 mW to 157 mW.

Figure 8:
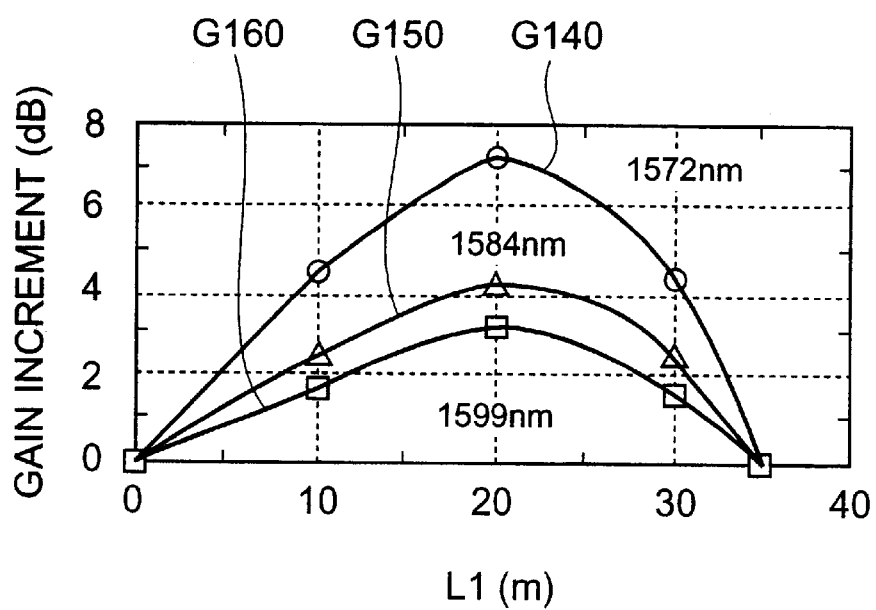
FIG. 8 is a graph showing the dependence of gain on the optical fiber length.

FIG. 8 is a graph showing the dependence of the gain increment on a length L1 of the first optical fiber. The gain increment indicates the gain difference between the optical fiber amplifier 6 and the optical fiber amplifier 1A. FIG. 8 shows gain increment curves G140, G150, and G160 for three signal light wavelengths: 1,572 nm, 1,584 nm, and 1,599 nm, respectively. The input signal power for the measurement is 10 dBm. The total length of the EDFs (the sum of the first and second optical fiber lengths) for amplification is 35 m. Referring to FIG. 8, the optimum value of the length L1 is about 20 m. In a wavelength of 1,572 nm, a gain increment of 7 dB or more is attained.

The foregoing experimental results find it preferable that the optical isolator be disposed at a position which satisfies $0.25 \leq L1/(L1+L2) \leq 0.85$ in optical fiber amplifier. When the total length is 35 m and the second optical fiber length is L2, the first optical fiber length L1 is about 10 to 30 m.

Figure 9:
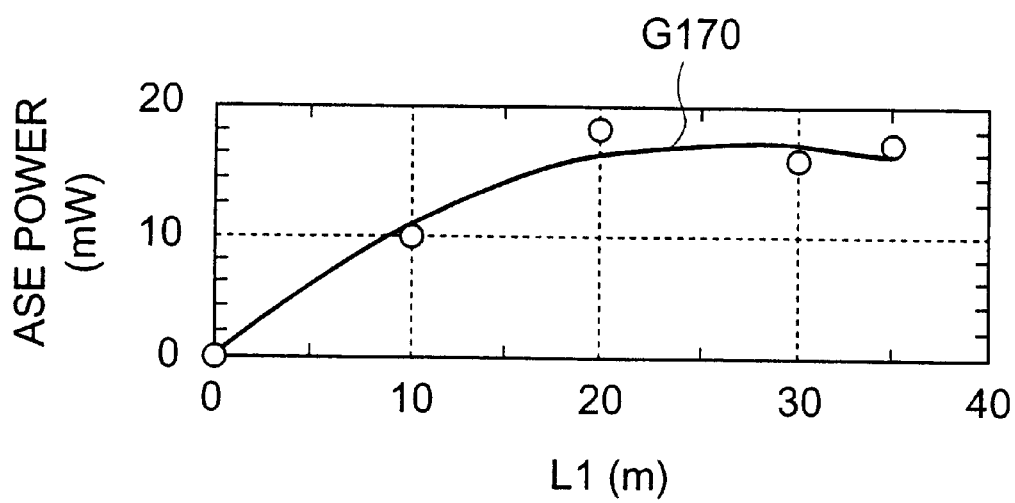
FIG. 9 is a graph showing the dependence of ASE power on the optical fiber length.

FIG. 9 is a graph showing the dependence of ASE light power on the first optical fiber length L1. The backward ASE light power increases until the first optical fiber length L1 increases up to 20 m, and then tends to be saturated as the length L1 exceeds 20 m. This tendency represents that the length of the second optical fiber 14 has an optimum value in association with efficient pumping. The inventor thinks that this saturation of the ASE light power relates to the optimum value in the gain increase.

Figure 10:
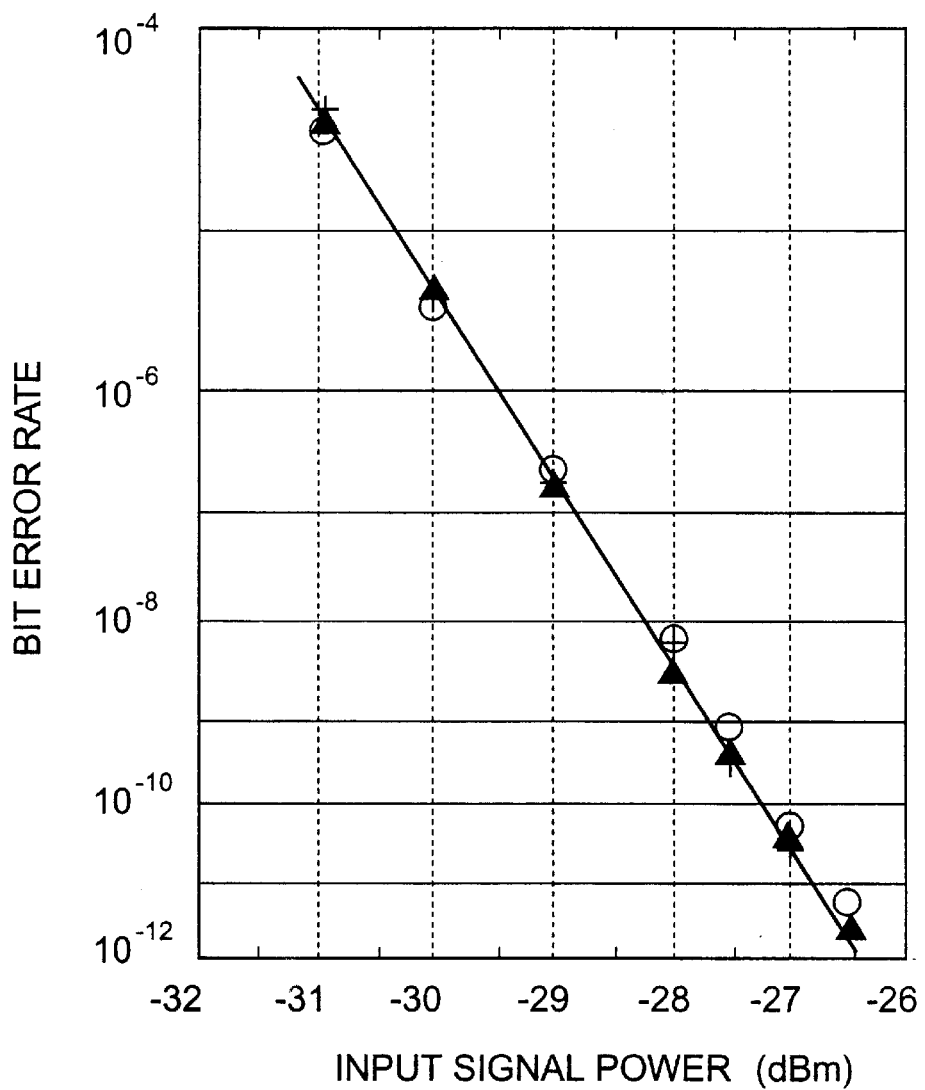
FIG. 10 is a graph showing bit error rate characteristics.

FIG. 10 is a graph showing a bit error rate measured to obtain the amplification characteristic of the optical fiber amplifier 1A. The bit error rate was measured by modulating a DFB laser having a laser oscillation wavelength of 1,585 nm at 2.5 Gbps. The bit error rate was measured while changing the input power to the receiver using an optical attenuator.

Referring to FIG. 10, symbol "○" represents measurement values for the optical fiber amplifier 1A, symbol "▲" represents measurement values for the optical fiber amplifier 6, and symbol "+" represents measurement values without an optical fiber amplifier (so-called back-to-back). These results indicate that there is no performance difference in the bit error rate between the optical fiber amplifier 1A and the optical fiber amplifier 6. This indicates that the optical separation between the signal input port 10a and the signal output port 10b of the optical amplification portion 10 is sufficient in the optical fiber amplifier 1A.

Figure 11:
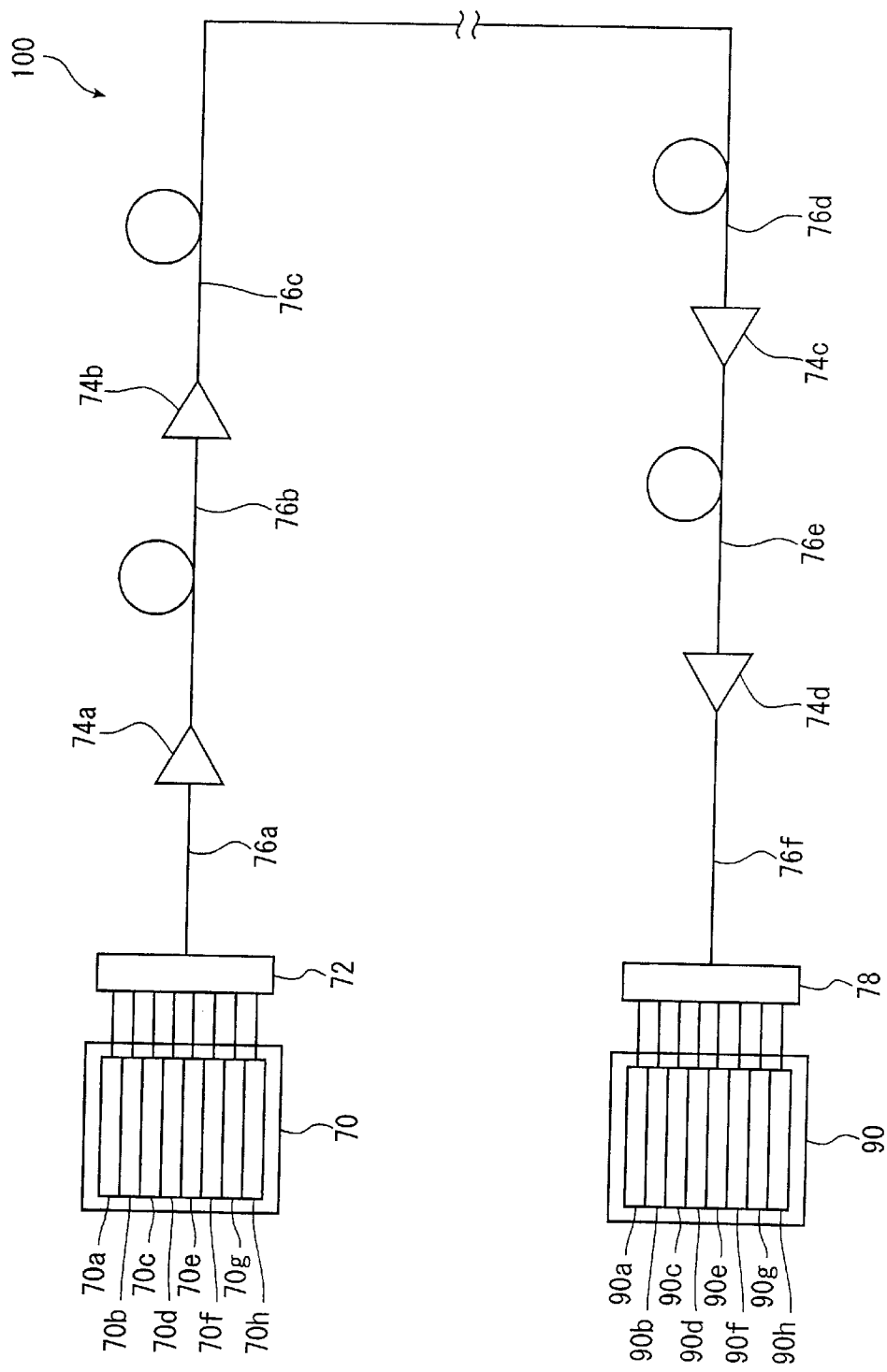
FIG. 11 is a block diagram of an optical communication system.

FIG. 11 is a block diagram of an optical communications system having the optical fiber amplifier described in the embodiments. An optical communications system 100 comprises a WDM optical transmitter 70, optical multiplexer 72, optical fiber amplifiers 74a to 74d, optical demultiplexer 78, and WDM optical receiver 90. The optical fiber amplifiers 74a to 74d, optical multiplexer 72, and optical demultiplexer 78 are optically connected with each other through optical transmission lines 76a to 76f. Although the WDM optical transmitter 70 includes optical transmission units 70a to 70h corresponding to eight channels with respective different wavelengths in this embodiment, the WDM optical transmitter 70 may have an arbitrary number of optical transmission units. The outputs of the optical transmission units 70a to 70h are connected to the optical multiplexer 72 in correspondence with the number of optical transmission units. In this embodiment, the WDM optical receiver 90 includes optical receiver units 90a to 90h corresponding to eight channels. The inputs of the optical receiver units 90a to 90h are connected to the optical demultiplexer 78. The amplifiers according to the embodiments described above can be used as the optical fiber amplifiers 74a to 74d. Thus, the optical communications system 100 has the advantages provided by the optical fiber amplifier of the present invention. That is, since the pump power for optical amplification can be suppressed in the optical communications system, heat generation in the optical fiber amplifier can be reduced. This can improve the reliability of the system.

In the optical communications system 100, it is preferable that the wavelength range of optical signals, generated by the optical transmitter 70 and received by the optical receiver 90, falls within 1,560 nm to 1,610 nm. Since transmission in one wavelength component is also taken into consideration, a wavelength range with sufficient gain, i.e., a wavelength range from 1,565 nm to 1,610 nm, is employed.

Having been described and illustrated the principle of the present invention in its preferred embodiments, those skilled in the art recognize that various changes and modifications in arrangements and details can be made without departing from such principle, so all the changes and modifications are claimed in the appended claims without departing from the spirit and scope of the invention.

What is claimed is:

1. An optical fiber amplifier having an input terminal and an output terminal, comprising:

an optical amplification portion having an input port provided so as to receive pumping light, an output port provided so as to provide an amplified version of said signal light, and an optical fiber device provided between the input port and the output port, said optical fiber device including a first erbium-doped optical fiber, said first optical fiber having first and second ends, said first end being optically coupled to said input port, said second end being optically coupled to said output port, said signal light propagating in said first optical fiber from said first end to said second end; and an optical circulator portion having a first port optically coupled to the input terminal, a second port optically coupled to the input of said optical amplification portion, a third port optically coupled to the output of said optical amplification portion, and a fourth port optically coupled to the output terminal, wherein said signal light entering the first port is supplied to the second port, light entering the second port is supplied to the third port, wherein said signal light entering the third port is supplied to the fourth port.

2. An optical fiber amplifier having an input terminal and an output terminal, comprising:

an optical amplification portion having an input port provided so as to receive pumping light, an output port provided so as to provide an amplified version of said signal light, and an optical fiber device provided between the input port and the output port, said optical fiber device including a first erbium-doped optical fiber, said first optical fiber having first and second ends, said first end being optically coupled to said input port, said second end being optically coupled to said output port, said signal light propagating in said first optical fiber from said first end to said second end; and an optical circulator portion comprising first and second 3-port optical circulators, said first and second 3-port optical circulators each having first, second, and third ports, wherein light from the first port passes to the second port, and light from the second port passes to the third port;

wherein the first port of said first 3-port optical circulator is coupled to the input terminal;

wherein the second port of said first 3-port optical circulator is coupled to the input of said optical amplification portion;

wherein the first port of said second 3-port optical circulator is coupled to the output terminal;

wherein the third port of said first 3-port optical circulator is coupled to the second port of said second 3-port optical circulator; and wherein the third port of said second 3-port optical circulator is coupled to the output port of said optical amplification portion.

3. The amplifier according to claim 1, further comprising a pump light source for generating the pumping light.

4. The amplifier according to claim 1, wherein said optical fiber device further includes second optical fiber, wherein said first and second optical fiber is provided in series between the input port and the output port, wherein the second end of said first optical fiber is optically coupled to the first end of said second optical fiber so as to receive said signal light, wherein the received signal light propagates in said second optical fiber from the first end thereof to the second end thereof, and wherein said second end of said second optical fiber is optically coupled to said third port of said optical circulator portion so as to provide said third port with said signal light, said second optical fiber being doped with at least erbium.

5. The amplifier according to claim 4, wherein said optical amplification portion further comprises an optical isolator provided between said first and second optical fibers.

6. The amplifier according to claim 5, wherein a length L1 of said first optical fiber and a length L2 of said second optical fiber satisfy $0.25 \leq L1/(L1+L2) \leq 0.85$.

7. An optical fiber amplifier having an input terminal and an output terminal, comprising:

an optical amplification portion having an input port provided so as to receive pumping light, an output port, and an optical fiber device doped with erbium and provided between the input port and the output port; and an optical circuit device provided between said input and output terminals and said optical amplification portion, said optical circuit device being capable of transmitting light in a 1,580-nm band between the input terminal and the input port of said optical amplification portion, said optical circuit device being capable of transmitting light in the 1,580-nm band between the output port of said optical amplification portion and the output terminal, and said optical circuit device being capable of blocking light in the 1,580-nm band and transmitting light in a 1,550-nm band between the input port and the output port of said optical amplification portion.

8. The amplifier according to claim 7, wherein said optical circuit device has first and second optical filter portions;

wherein said first optical filter portion comprises a first port optically coupled to the input port of said optical amplification portion, a second port, and a third port, and said third port of said first optical filter portion is optically coupled to the input terminal;

wherein said second optical filter portion has a first port optically coupled to the output port of said optical amplification portion, a second port optically coupled to the second port of said first optical filter portion, and a third port optically coupled to the output terminal; and wherein each of said first and second optical filter portions comprises means for filtering light, said means being provided between the first port and the second and third ports.

9. The amplifier according to claim 8, wherein said means for filtering light comprises a dielectric multilayer filter.

10. The amplifier according to claim 8, wherein said means for filtering light is capable of reflecting light in one band of the 1,550-nm band and the 1,580-nm band and transmitting light in the other band of the 1,550-nm band and the 1,580-nm band.

11. The amplifier according to claim 7, further comprising a light source for generating the pumping light.

12. The amplifier according to claim 7, wherein said optical fiber device comprises first and second optical fibers connected in series between the input port and the output port, said first and second optical fibers being doped with at least erbium.

13. The amplifier according to claim 12, wherein said optical amplification portion further comprises an optical isolator provided between said first and second optical fibers.

14. The amplifier according to claim 13, wherein a length L1 of said first optical fiber and a length L2 of said second optical fiber satisfy the following condition: $0.25 \leq L1/(L1+L2) \leq 0.85$.

15. A method of optically amplifying signal light using an optical fiber device, said optical fiber device including first and second optical fibers, each of the first and second optical fibers having first and second ends, the second end of the first optical fiber being optically coupled to the first end of the second optical fiber, and the first and second optical fibers being doped with erbium, comprising the steps of:

providing the signal light and pumping light to the first end of the first optical fiber, wherein the signal light propagates in a first direction from the first end of the first optical fiber to the second end of the second optical fiber;

obtaining ASE light from the first end of the first optical fiber;

providing the ASE light to the second end of the second optical fiber; and obtaining amplified signal light from the second end of the second optical fiber.

16. The method according to claim 15, wherein the step of obtaining the ASE light from the first end of the first optical fiber comprises the step of obtaining first ASE light, propagating in a second direction different from said first direction, from said first end of the first optical fiber;

wherein the step of providing the ASE light to the second end of the optical fiber comprises the step of providing the first ASE light to the second end of the second optical fiber.

17. The method according to claim 16, further comprising the steps of:

obtaining second ASE light, propagating in said first direction, from the second end of the first optical fiber; and providing the second ASE light to the first end of the second optical fiber.

18. An optical communications system for transmitting an optical signal having one or a plurality of wavelength components from an optical transmitter to an optical receiver, comprising:

an optical fiber amplifier according to claim 1, provided between the optical transmitter and the optical receiver;

a first optical transmission line having one terminal optically coupled to the input terminal of said optical fiber amplifier so as to supply optical signal from the optical transmitter to said optical fiber amplifier; and a second optical transmission line having one terminal optically coupled to the output terminal of said optical fiber amplifier so as to supply optical signal from said optical fiber amplifier to the optical receiver.

19. An optical communications system for transmitting an optical signal having one or a more wavelength components from an optical transmitter to an optical receiver, comprising:

an optical fiber amplifier according to claim 1, provided between the optical transmitter and the optical receiver;

a first optical transmission line having one terminal optically coupled to the input terminal of said optical fiber amplifier so as to supply optical signal from the optical transmitter to said optical fiber amplifier; and a second optical transmission line having one terminal optically coupled to the output terminal of said optical fiber amplifier so as to supply optical signal from said optical fiber amplifier to the optical receiver;

wherein the optical signal has a wavelength ranging from 1,560 nm to 1,610 nm.

* * * * *